UNITED STATES PATENT OFFICE.

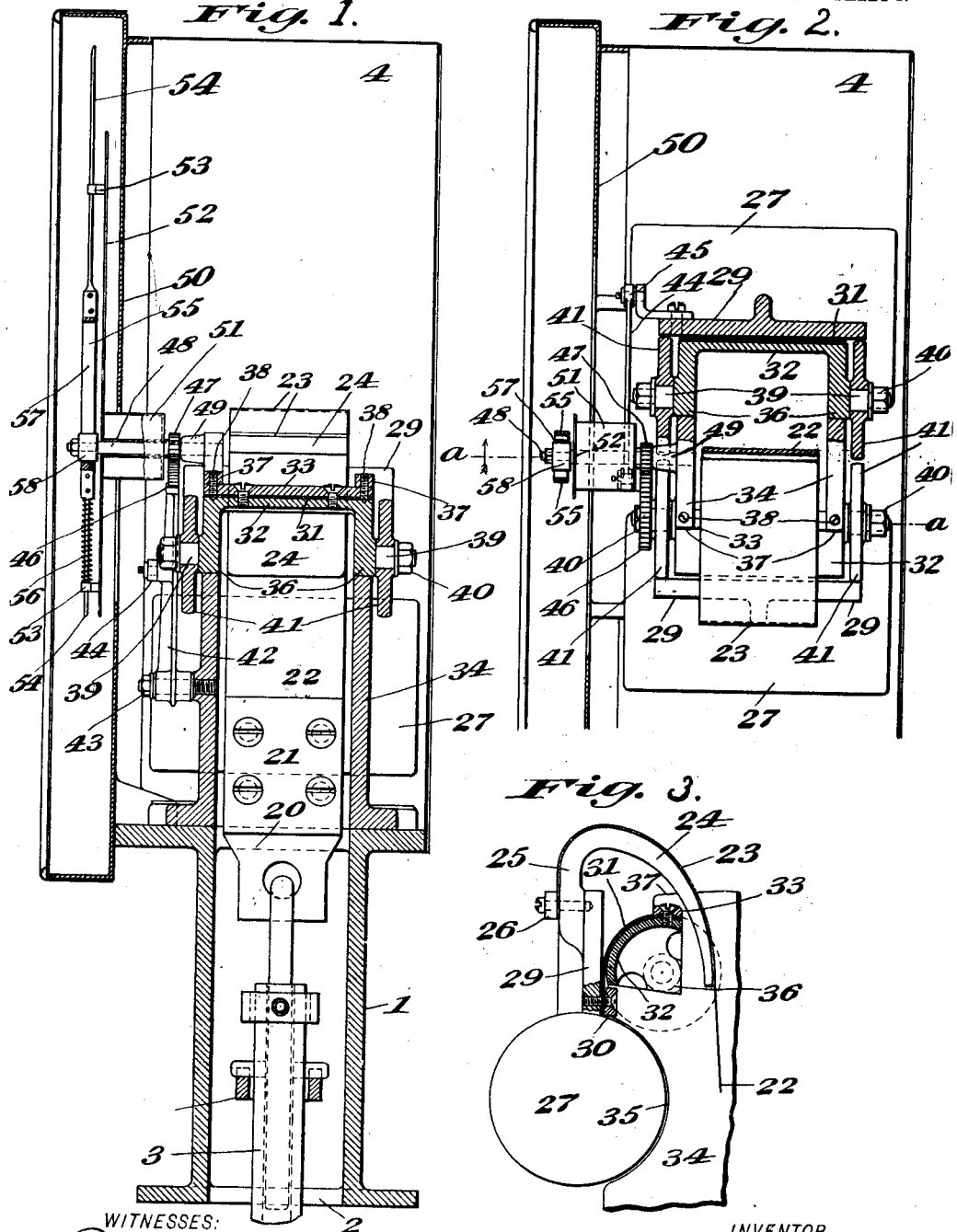

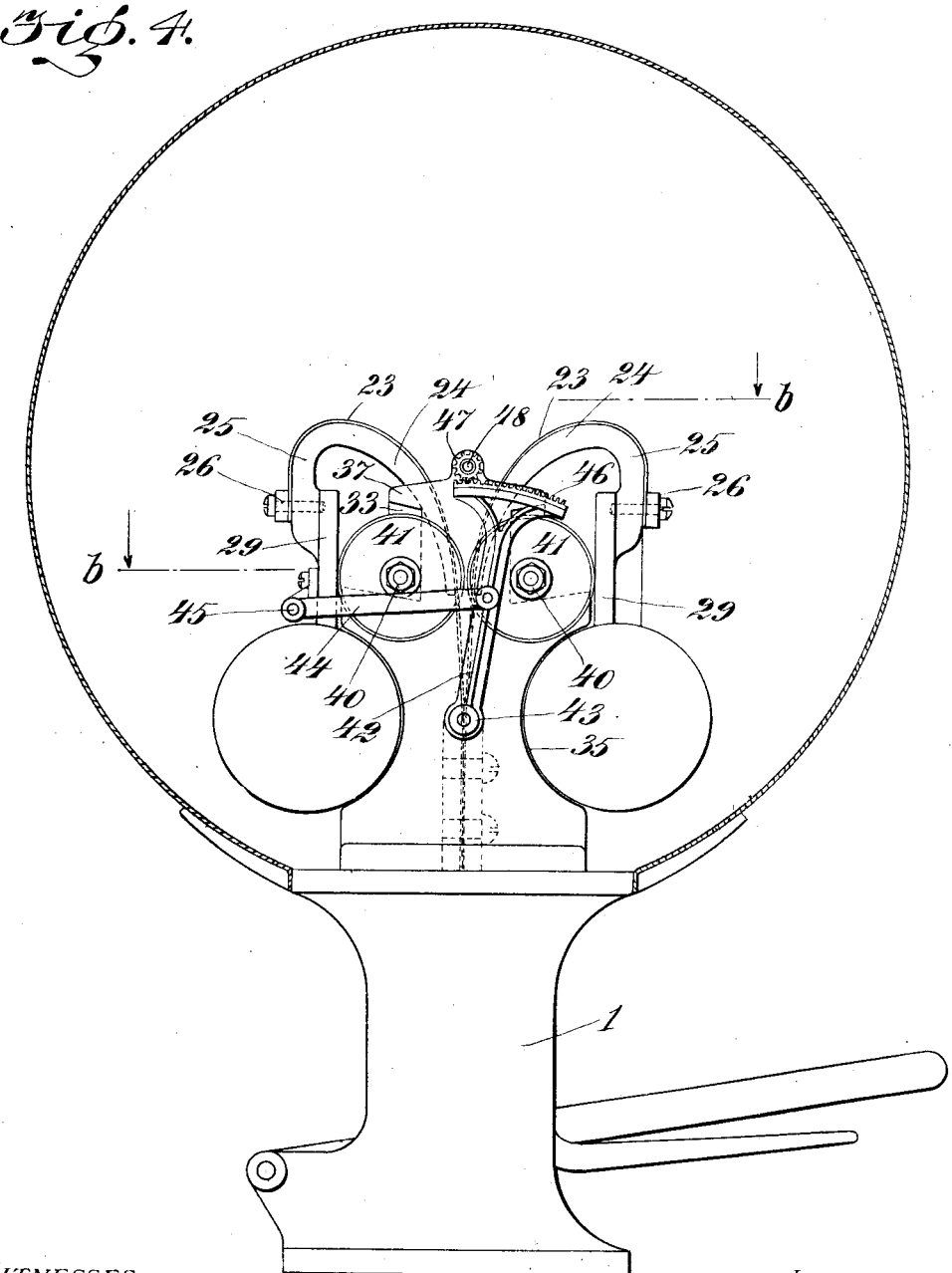

WILHELM SIMONSSON, OF NEW YORK, N. Y.

MEASURING INSTRUMENT.

1,064,670.     Specification of Letters Patent.     Patented June 10, 1913.

Application filed August 5, 1907. Serial No. 387,144.

*To all whom it may concern:*

Be it known that I, WILHELM SIMONSSON, a subject of the King of Sweden, and a resident of the city and State of New York, have invented certain Improvements in Measuring Instruments, of which the following is a specification.

This invention relates to certain improvements in measuring instruments, and more particularly in that class of such instruments of which the device shown and claimed in my co-pending patent application, Serial No. 322,709, filed June 21, 1906, is a type, wherein pendulum balancing or measuring means supported upon a shifting fulcrum are provided, and the object of the invention is to provide an instrument of this general character having a novel and improved construction and arrangement of such balancing or measuring mechanism, whereby increased strength and simplicity of construction are attained, together with reliability and accuracy of operation, and lessened liability of deterioration and derangement during use.

The invention consists, in part in a measuring instrument of the pendulum type having two members, one of which is a pendulating weighted lever, and the other of which is a fulcrum support around which said lever is adapted for rocking movement during the measuring operation, wherein one of such members has a curved surfaced part supported for turning movement and adapted for rolling contact upon the other member for the effective support of the lever in relation to said fulcrum support with a minimum of frictional loss due to surface inequalities or to shifting of the point of support of the lever during its rocking movements.

Another feature of improvement comprised within the present invention resides in the employment, in connection with a measuring instrument of the pendulum type, of means whereby the suspending device for the pendulating weighted lever is preserved from being bound between the lever and its fulcrum support and is thereby relieved from the strains which would otherwise be imposed upon it.

The invention further consists in a measuring instrument of the character above set forth wherein the means for preventing binding of the suspending device between the lever and its fulcrum support includes similar separately formed disk like members interposed between the lever and its fulcrum support in spaced relation, so as to support the lever during its rocking movements with a minimum of friction and to facilitate and simplify the construction and assembling of the parts.

The invention also contemplates certain novel features of the construction, and combinations and arrangements of the several parts of the improved measuring instrument, whereby certain important advantages are attained, and the instrument is rendered simpler, less expensive and otherwise better adapted and more convenient for use, all as will be hereinafter fully set forth.

The novel features of the invention will be carefully defined in the claims.

In order that my improvements may be the better understood, I will now proceed to describe the same with reference to the accompanying drawings, wherein—

Figure 1 is a vertical section taken through the instrument in the broken plane indicated by the line $a$—$a$ in Fig. 2; Fig. 2 is a partial sectional plan view taken through the improved measuring instrument in the plane indicated by the line $b$—$b$ in Fig. 4; Fig. 3 is a fragmentary sectional detail view showing certain features of the measuring mechanism to be hereinafter referred to; and Fig. 4 is a vertical section taken through the instrument in a plane at right angles to the plane of the section in Fig. 1, and showing the measuring or balancing mechanism in front elevation.

In these views, wherein I have illustrated my invention embodied in a measuring instrument of the pendulum type shown and claimed in my co-pending patent application, Serial No. 767,761, the instrument is provided with a base frame 1 apertured at its lower part as seen at 2 for the passage of a vertically directed draft rod 3, which is adapted to be connected with the load supporting member of the instrument in any preferred way in such a way that a strain commensurate with the load may be transmitted to the measuring or balancing mechanism to operate the same. The load receiving member may be a pan, platform or equivalent device, which I have not considered it essential to illustrate herein.

At the upper end of the draft rod 3 is a flattened part 20 provided with a clamping plate 21, secured by screws or otherwise in such a manner as to permit of securely clamping and holding between said parts 20 and 21 the lower end portions of steel or other flexible tapes or bands 22, the upper end portions 23 of which are upwardly extended in the casing 4 and are gradually divergent from each other, being carried over the outer surfaces of reversely curved arms or extensions 24, 24 forming parts of pendulating levers, the structure and operation of which is, in the main, similar to the structure and operation of the corresponding parts shown and claimed in my before-mentioned co-pending patent application, Serial No. 767,761. As shown herein, there are two of these levers, although but one, or any desired number of them may be employed without departure from my invention, and said levers have downwardly extended parts 25 whereon the ends of the tapes or bands 22 are secured by clamping plates 26 held by screws or the like to the said levers in position for secure clamping engagement over the extremities of said bands or tapes. The lower ends of the downwardly extended parts 25, 25 of said pendulating levers also carry weights 27, 27 and adjacent to each such weight there is secured, as shown at 30, the lower end portion of a suspender 31 which is also formed, like the bands or tapes 22, 22 from thin flexible metal, and has its upper part extended around a curved bearing surface produced upon a part or block 32, to the upper part of which the upper end of said flexible suspender is secured by means of a transverse clamping strip 33 in such a manner as to sustain the pendulating lever effectively in relation to the bearing block or part 32 so that the lever may swing or rock freely around said bearing block or part during the measuring operation.

34 represents an auxiliary fulcrum supporting frame or extension of the base frame 1 within the casing or housing 4, the opposite sides whereof are recessed at their lower parts as seen at 35 to afford spaces to receive the weights 27, 27 of the pendulating levers when the same are inactive, and at their upper parts the said opposite sides of the auxiliary frame or extension are notched out to provide seats for the angular ends 36 of the bearing blocks or parts 32, being provided, as set forth in said copending application Serial No. 767,761, with portions 37 which overhang said notched out portions and beneath which said angular ends of the bearing blocks or parts 32 are held by means of screws 38 in such a way as to prevent their dislodgment and to brace and strengthen the upper part of the auxiliary frame while permitting ready withdrawal of said bearing blocks 32 or their ready insertion within the seats during the assembling of the instrument.

The angular ends 36 of the respective bearing blocks or parts 32 according to my present invention carry alined trunnions 39 axially arranged with respect to the curved surfaces of said parts or blocks 32 and on said trunnions 39 are held by means of nuts 40, fulcrum disks or parts 41, 41, similar to one another, but having radii greater than those of the curved surfaces of the blocks or parts whereon the suspenders 31 contact, the said fulcrum disks or parts 41 being capable of turning movement upon their trunnions 39 in the construction herein shown, and having their perimeters adapted to be engaged and traversed by the opposite edge portions of flat track like surfaces 29 produced upon the downwardly extended portions 25 of the pendulating levers, whereby said levers are effectively supported upon said rotatable disks or parts 41 for rocking or swinging movement around their respective blocks or parts 32 during the measuring operation. By this construction and arrangement of the parts it will be seen that when a load is applied to the load supporting member (not shown) a downward draft will be exerted upon the tapes or bands 22, 22 and will be transmitted thereby to the reversely curved upper parts or extensions 24 of the pendulating levers in such a manner as to cause said levers to swing outward in opposite directions and away from each other, whereby their flat track-like surfaces 29, 29 are caused to travel around the perimeters of the rotatable fulcrum disks or parts 41 by reason of the connection of the suspenders 31 with the bearing blocks 32.

As in the structure shown and claimed in my above-recited patent application Serial No. 767,761, in this operation of the measuring instrument, the shifting of the fulcra for the levers affords a gradual lengthening of the weighted lower ends thereof such as is calculated to increase very materially the capacity of the instrument, while at the same time the peculiar nature of the connections of the draft devices with the upper ends of the levers assures the gradual shortening of said upper ends of the levers simultaneously with the lengthening of their weighted lower ends, so as further to augment the measuring capacity of the instrument, and the levers being normally pendent when in inactive position and being adapted to be swung upward toward the horizontal during the measuring operation, it is apparent that the shifting of the fulcra for said levers upwardly around the curved upper surfaces of the fulcrum disks or parts 41, 41 assures the support of the said levers with an efficiency which varies and gradually increases with the increase of the load upon the load supporting member, whereby the excessively increased strains which would otherwise be imposed upon the thin tape-like suspenders, and which might tend to stretch or disrupt the same, are in a great measure borne by said fulcrum disks or parts 41.

In the operation of the mechanism constructed according to my present invention it will also be evident that by reason of the fulcrum disks or parts 41, 41 having radii greater than those of the curved surfaces of the bearing blocks or parts 32 whereon the suspenders wind when the levers are rocked, and being positioned at opposite sides of the suspenders, said disks 41 afford material protection to the suspenders, holding the flat track-like bearing surfaces 29, 29 spaced apart from said curved surfaces of the blocks or parts 32 to such an extent as will prevent them from bearing forcibly upon the thin tape-like suspenders in such fashion as might tend to impose undue strains upon these parts, which are of necessity of a somewhat delicate character.

The use of the peculiar construction of the bearing blocks or parts 32, each provided with two of the enlarged fulcrum disks or parts, in spaced relation, and each formed separately from and removably supported upon the frame, and the shaping of the parts or members 41, 41 in disk-like or rounded form, as herein shown, enables these parts to be manufactured and assembled for use at comparatively small expense and with great accuracy, and it will also be obvious that in the operation of the mechanism constructed as above described, with said disk-like parts 41, 41 supported for turning movement, a substantially perfect rolling contact of each lever upon its corresponding fulcrum supports is attained, and slipping of the parts one upon the other during the swinging or rocking movement of the levers is substantially eliminated for the avoidance of frictional losses and consequent inaccuracy. Should the contacting surfaces of the levers and disks 41 not be absolutely accurate, a slight automatic turning of the disks or parts 41, 41 upon the pintles 39 will afford compensation so that sliding movement of the levers over said fulcrum disks or parts 41 will be avoided.

42 represents a lever pivoted at 43 upon the auxiliary frame or extension 34 and connected at its central part with one end of a link 44, the opposite end of which has connection, as shown at 45, with one of the pendulating weighted levers in such a manner that the lever 42 is caused to oscillate or vibrate in unison with the rocking movements of the pendulating levers during the operation of the instrument, and 46 represents a segment rack carried upon the upper end of this lever 42 and engaged with the teeth of a gear pinion 47 mounted to turn freely upon a shaft 48 which has a bearing 49 at the upper part of the auxiliary frame or extension, the extremity of said shaft being passed through an opening at the central part of the dial 50 so as to extend in front thereof and carrying a pointer 52 adapted to play over the dial graduations during the measuring operation so as to indicate the result thereof in a well known way.

From the above description it will be seen that the improved measuring instrument embodying my invention is of an extremely simple and comparatively inexpensive nature, and is particularly well adapted for use by reason of its compactness, strength and accuracy, which latter quality is greatly improved and enhanced by the peculiar combination and arrangement of the parts herein set forth which permits of avoiding losses through friction.

It will also be obvious from the above description that the measuring instrument constructed according to my invention is capable of considerable change without material departure from the principles and spirit of the invention, as defined in the appended claims, and for this reason I do not desire to be understood as limiting myself to the precise formation and arrangement of the several parts of the instrument herein set forth, in carrying out my invention in practice.

Having thus described my invention, what I claim and desire to secure by Letters Patent is:

1. A measuring instrument having a pendent flexible suspender, a member having a surface adapted to be traversed by said suspender during the measuring operation, a suspended weighted lever supported for rocking movement by said suspender and adapted, when moved, to traverse the surface of said member, and means for holding the lever out of binding engagement with the suspender when the lever is rocked.

2. A measuring instrument having a bearing member provided with a curved surface, a pendent flexible suspender arranged to wind upon the curved surface of said member, a lever supported for swinging movement upon the suspender and adapted, when moved, to traverse the bearing member, a weight connected with the lower part of said lever, a part concentric with, but of greater radius than the curved surface of the bearing member, and arranged for contact with the lever, when the same is moved, to hold said lever from binding engagement with the suspender, and draft and index mechanisms operatively connected with said lever.

3. A measuring instrument comprising a member having a curved surface, a pendulating weighted lever adapted, when moved, to traverse the curved surface of said member, a flexible suspender for the lever, means movable relatively to the curved surfaced member and arranged to hold the lever out of contact with the suspender during movement of the lever, and draft and index mechanisms operatively connected with said lever.

4. A measuring instrument comprising a flexible suspender, a pendulating weighted lever connected with the suspender, two members one of which is movable relatively to the other, one of said relatively movable members having a curved surface whereon the suspender is arranged to wind and the other of said relatively movable members being arranged to hold the lever out of contact with the suspender during the movement of the lever, and draft and index mechanisms.

5. A measuring instrument comprising a bearing member having a curved surface, a flexible suspender arranged to wind upon the curved surface of said bearing member, a weighted lever suspended from said suspender and adapted, when moved, to traverse said bearing member, a movable part engaged with the lever and adapted to hold the same from contact with the suspender during the movement of the lever along said bearing member, and draft and index mechanisms operatively connected with the said lever.

6. A measuring instrument comprising a bearing member, having a curved surface, a flexible suspender arranged to wind upon the curved surface of the bearing member, a weighted lever suspended at the lower part of the suspender, spaced movable fulcrum disks upon the bearing member and having perimeters arranged for contact with the lever to hold the same from pressure upon the suspender when the lever is moved, and draft and index mechanisms operatively connected with said lever.

7. A measuring instrument having two members one of which is a suspended lever weighted at its lower part and capable of swinging movement, and the other of which is a fulcrum member, means for suspending said lever, and a part having connection with one of said members and independent of the suspending means for shifting engagement with the other of said members and capable of operation to hold said members from contact during movement of the lever.

8. A measuring instrument having two members, one of which is a suspended lever capable of swinging movement, and the other of which is a bearing member, means for suspending the lever from the bearing member and a part mounted for turning movement and having shifting engagement with one of the members and capable of operation to hold the members spaced apart during movement of the lever.

9. A measuring instrument having a pendulating lever weighted at its lower part and capable of swinging movement, and fulcrum devices for the lever including spaced fulcrum disks having corresponding curved surfaces engaged with said lever and affording a shifting fulcrum therefor.

10. A measuring instrument having a suspended lever weighted at its lower part adapted for swinging movement, and a fulcrum part mounted to turn and having a curved surface adapted for rolling contact with the lever and affording a shifting fulcrum therefor and means for suspending the lever from the fulcrum part.

11. A measuring instrument having a suspended lever weighted at its lower part and capable of swinging movement, spaced fulcrum disks mounted to turn and having corresponding curved surfaces adapted for rolling contact with the lever and affording a shifting fulcrum therefor and means for suspending the lever from the fulcrum disks.

12. A measuring instrument having a suspended lever weighted at its lower end capable of swinging movement, a fulcrum part mounted to turn and having a curved surface adapted for rolling contact with the lever and affording a shifting fulcrum therefor operable to lengthen the weighted end of the lever during upward swinging movement thereof, means for suspending the lever from the fulcrum part and mechanism for actuating the lever including a draft device, and means affording connection between the draft device and the upper end of the lever operable to shorten said upper end of the lever simultaneously with the lengthening of its weighted lower end.

13. A measuring instrument having a suspended lever weighted at its lower end capable of swinging movement, spaced fulcrum parts mounted to turn and having corresponding curved surfaces adapted for rolling contact with the lever and affording a shifting fulcrum therefor operable to lengthen the weighted lower end of the lever during upward swinging movement thereof, means for suspending the lever from the fulcrum parts and mechanism for actuating the lever including a draft device and means affording connection between the draft device and the upper end of the lever operable to shorten said upper end of the lever simultaneously with the lengthening of its weighted lower end.

14. A measuring instrument having a suspended lever weighted at its lower end capable of swinging movement, spaced fulcrum parts mounted to turn and having corresponding curved surfaces adapted for rolling contact with the lever and affording a shifting fulcrum therefor operable to lengthen the weighted end of the lever during upward swinging movement thereof, a suspender having its lower end connected with the lever to support the same, a bearing member having a curved surface traversed by the suspender, means for suspending the lever from the bearing member and mechanism for actuating the lever including a draft device and means affording connection between the draft device and the upper end of the lever operable to shorten said upper end of the lever simultaneously with the lengthening of its weighted lower end.

15. A measuring instrument having a lever mounted to rock and supporting means for the lever including a bearing member, a suspending device between the lever and said member and spaced similarly curved fulcrum parts mounted upon the bearing member and adapted for contact with said lever at opposite sides of said suspending device to support the same during its rocking movements.

16. A measuring instrument having a lever mounted to rock, and supporting means for the lever including a bearing member having a central curved surface, a suspender arranged to wind upon said curved surface and having an extremity connected with the lever, and spaced similarly curved fulcrum parts mounted upon said bearing part and adapted for contact with said lever to support the same during its rocking movements.

In witness whereof I have hereunto signed my name this 3rd day of August 1907, in the presence of two subscribing witnesses:

WILHELM SIMONSSON.

Witnesses:
P. MARGULIES,
J. D. CAPLINGER.